United States Patent [19]

Tacklind

[11] Patent Number: 5,187,621
[45] Date of Patent: Feb. 16, 1993

[54] RFI/EMI REDUCTION FOR HEAD AND DISK ASSEMBLY

[75] Inventor: Thomas A. Tacklind, San Martin, Calif.

[73] Assignee: Quantum Corporation, Milpitas, Calif.

[21] Appl. No.: 674,385

[22] Filed: Mar. 25, 1991

[51] Int. Cl.$^5$ .................... G11B 33/14; H05K 9/00
[52] U.S. Cl. ...................... 360/97.02; 174/35 GC; 174/35 R; 360/97.03
[58] Field of Search ............ 360/128, 97.01, 97.02, 360/97.03, 98.01; 174/35 R, 35 GC, 35 C

[56] References Cited

U.S. PATENT DOCUMENTS

| 1,855,447 | 1/1929 | Hagstedt | 174/51 |
| 2,065,651 | 12/1936 | Burton | 174/35 |
| 2,604,507 | 7/1952 | Tyson | 174/35 |
| 4,567,317 | 1/1986 | Ehrlich et al. | 174/35 MS |
| 4,717,990 | 1/1988 | Togcu | 361/424 |
| 5,014,160 | 5/1991 | McCoy, Jr. | 174/35 G C |

FOREIGN PATENT DOCUMENTS 0207226 3/1986 European Pat. Off. ............ 361/424

OTHER PUBLICATIONS

Mesh EMI Gasketing Selection Guide 174-35CG.

*Primary Examiner*—David J. Severin
*Attorney, Agent, or Firm*—David B. Harrison

[57] ABSTRACT

Apparatus providing improved RFI/EMI shielding includes a base of conductive material, such as cast or forged aluminum alloy, the base defining a substantially continuous floor and integrally formed base sidewalls extending upwardly from the floor along the periphery thereof. The base sidewalls define an inset-stepped region above an upper outer peripheral ledge extending around the periphery of the base sidewalls. A plurality of closely spaced apart, knife-blade protrusions formed along the edge extend upwardly from the ledge and angle inwardly toward the base sidewalls within the inset-stepped region. A cover, substantially congruent with the base defines a ceiling and integral cover sidewalls extending downwardly to fit closely over the inset-stepped region so as to come into engagement with the knife-blade protrusions. A clamping arrangement, such as plural spaced apart screws passing through peripheral openings of the cover and entering threaded bores in the base for example, cause the cover securely to clamp down over the base such that facing portions of the cover are deformed over the knife-blade protrusions of the base, thereby establishing very low impedance, closely spaced apart contacts along the gap between the cover and base, for grounding out RFI/EMI.

7 Claims, 1 Drawing Sheet

RFI/EMI REDUCTION FOR HEAD AND DISK ASSEMBLY

FIELD OF THE INVENTION

The present invention relates to methods and apparatus for shielding electronic equipment from radio frequency and electromagnetic interference. More particularly, the present invention relates to methods and apparatus for providing RFI/EMI shielding for head and disk assemblies of rotating fixed disk data storage devices.

BACKGROUND OF THE INVENTION

Fixed disk drives are data storage devices in which a data transducer head "flies" in very close proximity, e.g. 4-8 microinches, above a rotating data storage surface. Because of the minute clearance between the head and the rotating disk, it is necessary to "fly" the head in a very controlled, hermetically sealed environment.

In order to establish the requisite environment as free from particulate contamination, head and disk assemblies typically include bases and removable covers mounted onto the base. The covers are removable to enable factory servicing of the head and disk assembly in low-particulate "clean room" or "clean tunnel" environments. In order to maintain the requisite hermetic seal against environmental contamination, usually a sealing gasket of suitable elastomeric material, is compressed between the cover and the base of the head and disk assembly. While the seal is very effective in preventing intrusion of contaminating particulates into the interior space of the head and disk assembly, it may also permit electromagnetic pollution to enter and corrupt the data storage and retrieval function of the disk drive data storage device, particularly where the device is located in close proximity to other electronic circuit elements, such as switching power supplies, high speed microprocessors, etc., which generate RFI/EMI.

In some head and disk assemblies, the base is cast of metal, such as aluminum alloy, and the cover is a sheet metal cutout or stamping, with very little function other than to enclose the open end of the base casting. In other head and disk assemblies, the cover, while remaining a cutout or stamping, also functions to mount or help secure components. In some examples found in the prior art, the journal assembly of a mass balanced rotary voice coil head positioner actuator is secured between a floor of the base casting and the cover, thereby to achieve greater rigidity and resistance to vibration by the actuator.

Disk drives have become smaller. Today, disk drives having two and one half inch diameter storage disks have been realized. These sub-micro Winchester disk drive subsystems are finding acceptance and application within miniaturized computing systems, such as laptop computers and electronic notepads. In these highly compacted devices (e.g. single disk versions may have a height including circuit board of ⅝ inch, a width of 2¾ inches, and a length of 3¾ inches, for example), the head and disk assembly of the disk drive is frequently mounted directly to a "motherboard" of the device, in very close proximity to sources of electromagnetic or radio frequency interference, of the types noted above. The most common susceptibility to RFI/EMI is through a peripheral gap that exists between the base and cover, a gap heretofore conventionally filled with an elastomeric sealing gasket.

A number of approaches have been taken in an attempt to seal the base-cover gap against RFI/EMI. One approach has been to apply a strip of copper, or conductive braid, over the gap between the base and the cover. Another approach has been to employ a conductive, typically carbon-loaded elastomeric gasket between the base and cover. Neither of these approaches has proven to be entirely satisfactory, particularly where the head and disk assembly must be in close proximity to RFI/EMI sources within a compact computing system or environment.

SUMMARY OF THE INVENTION WITH OBJECTS

A general object of the present invention is to provide improved RFI/EMI shielding within a small electronic or electromechanical assembly, such as a head and disk assembly of a fixed disk drive data storage device.

Another object of the present invention is to provide more effective RFI/EMI shielding to the interior electronics of a small electronic assembly, such as a miniature head and disk assembly, without requiring additional or special parts or components, whether they be peripheral bands or conductive elastomeric seals in the gap between the cover and base.

In accordance with the principles of the present invention, apparatus for providing improved RFI/EMI shielding includes a base of conductive material, such as cast or forged aluminum alloy, the base defining a substantially continuous floor and integrally formed base sidewalls extending upwardly from the floor along the periphery thereof. The base sidewalls define an inset-stepped region above an upper outer peripheral ledge extending around the periphery of the base sidewalls. A plurality of closely spaced apart, knife-blade protrusions formed along the edge extend upwardly from the ledge and angle inwardly toward the base sidewalls within the inset-stepped region. A cover, substantially congruent with the base defines a ceiling and integral cover sidewalls extending downwardly to fit closely over the inset-stepped region so as to come into engagement with the knife-blade protrusions. A clamping arrangement, such as plural spaced apart screws passing through peripheral openings of the cover and entering threaded bores in the base for example, cause the cover securely to clamp down over the base such that facing portions of the cover are deformed over the knife-blade protrusions of the base, thereby establishing very low impedance, closely spaced apart contacts along the gap between the cover and base, for grounding out RFI/EMI.

In one aspect of the invention, a hermetic seal is placed between the cover and base. Further in relation to this aspect, the seal may be placed between an upper peripheral surface of the base, and an interior facing peripheral surface of the cover.

In another aspect of the invention, the cover and base are components of a fixed disk data storage device. Further, in relation to this aspect, a rotary voice coil actuator has a journal structure secured to the floor of the base. The journal structure may also optionally be secured to the cover thereby to rigidize even more the journal and reduce a tendency to unwanted vibrations.

These and other objects, aspects, advantages and features of the present invention will be more fully

DETAILED DESCRIPTION OF A PREFERRED EMBODIMENT

Figure 1:
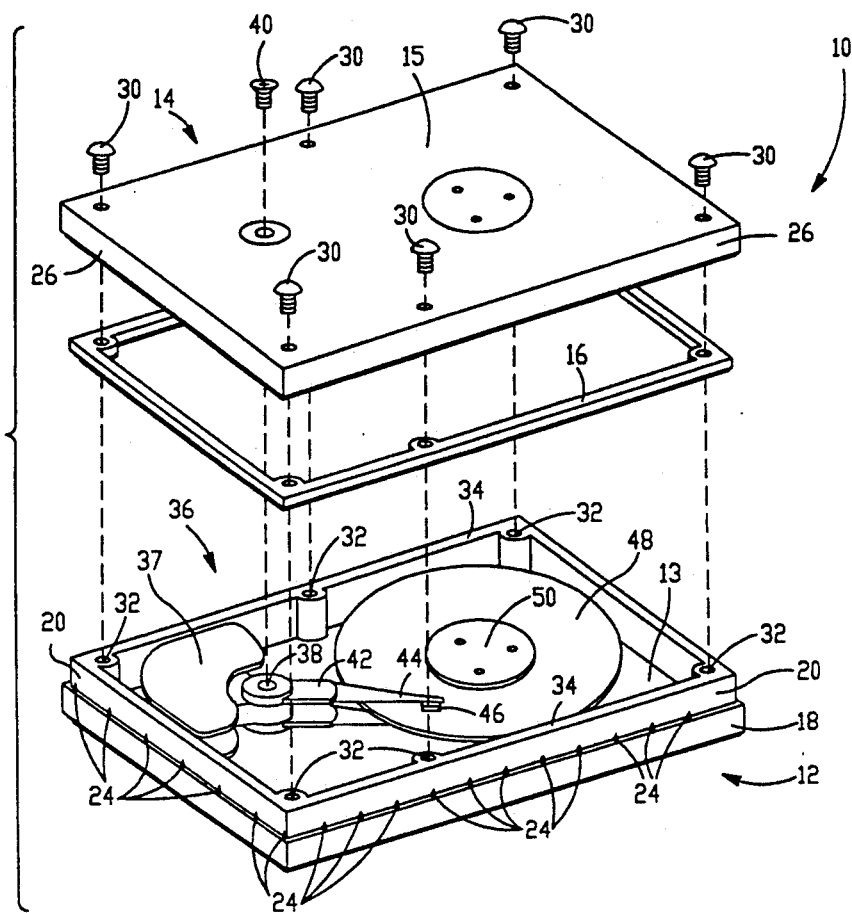
FIG. 1 is a highly diagrammatic, vertically exploded isometric view of a head and disk assembly of a sub-micro-Winchester fixed disk drive incorporating aspects and features of the present invention.

With reference to FIG. 1, an electronic assembly subject to RFI/EMI, such as a head and disk assembly 10 of a fixed disk drive data storage subsystem, includes e.g. a base casting 12, a cover 14, and a conventionally formed and composed elastomeric sealing gasket 16 for placement in a gap between the base 12 and cover 14 thereby effectuating a hermetic seal of an interior space relative to the ambient. (Pressure equalization with ambient air pressure may be provided by inclusion of a conventional "breather" filter which enables gaseous communication between the enclosed interior space and the external environment, but which prohibits intrusion of unwanted particulate contaminants.)

The base casting 12 may be injection molded of aluminum alloy with conventional molding techniques, and it is integrally formed with a floor 13 and with base sidewalls 18 extending upwardly and continuously along the periphery of the floor 13. An upper region 20 of the base sidewalls 18 is inwardly thinned and thereby defines a ledge or shelf 22.

Figure 3:
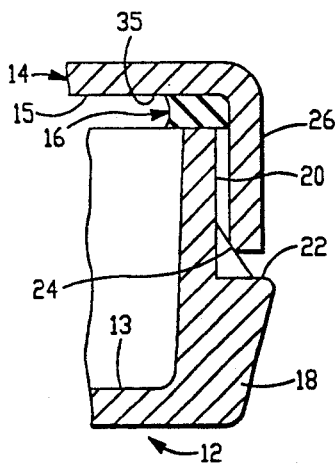
FIG. 3 is a view in section and elevation of a segment of the FIG. 1 head and disk assembly, taken along the line 3—3 in FIG. 2.
Figure 2:
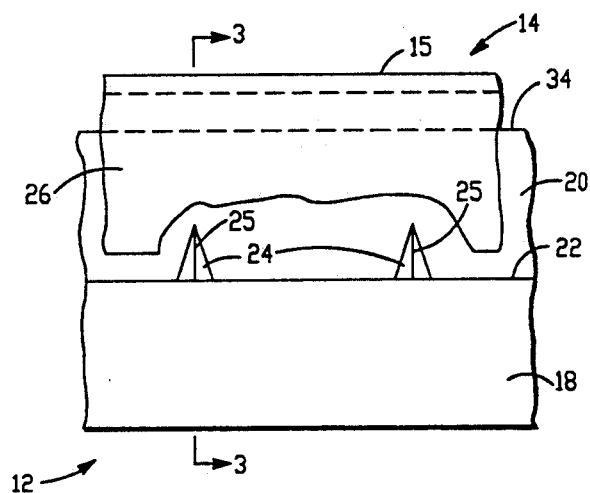
FIG. 2 is a highly diagrammatic and enlarged view in side elevation of a segment of the FIG. 1 head and disk assembly, illustrating aspects and features of the present invention in greater detail.

Disposed in closely spaced apart relationship along the ledge 22 are a series of integrally formed angled, knife-blade defining interference wedges 24. The wedges 24 each define a sharp, angled blade edge 25 which cuts into adjacently facing portions of sidewalls 26 of the cover 14, as best shown in FIG. 3. To provide effective RFI/EMI suppression, it has been found advantageous to place the interference wedges approximately on 12 millimeter centers along the ledge 22, for example. The spacing may be optimized to a particular frequency or band presenting troublesome RFI/EMI in a particular environment. Generally, the higher the frequency of interference, the closer together the interference wedges should be spaced.

The cover 14 may be an aluminum alloy stamping of a material having somewhat softer mechanical properties than the alloy forming the base casting 12, so that the interference wedges 24 bite into oppositely facing regions of depending sidewalls 26 of the cover 14, for example. The integrally formed sidewalls 26 are so dimensioned and designed that the sidewalls 26 fit downwardly into the space defined by, and adjacent to, the inset upper region 20 of the base sidewalls, also perhaps as best seen in FIG. 3.

The cover 14 may be clamped onto the base casting 12 by a plurality of screws 30 which thread into threaded openings 32 defined in bosses or interior formations of the base casting 12, as shown in FIG. 1, for example. When the screws 30 are tightened, the cover sidewall 26 is contacted and cut into by the knife blade edges 25 of the interference wedges 24. At the same time, the compression gasket 16 is being compressed between a peripheral top wall 34 of the base casting 12, and an oppositely facing inner peripheral portion 35 of the ceiling 15 of the cover 14 thereby achieving a hermetic seal.

Although not essential to an understanding of the invention, other elements of the head and disk assembly 10 illustrated in FIG. 1 include a mass balanced rotary voice coil actuator 36 including a magnet/wedge coil assembly 37, and a journal assembly 38 integrally mounted to the floor 13 of the base casting 12. The journal assembly may optionally be secured to the cover 15 by a threaded screw 40, for example, should further stiffening A rotary head arm assembly 42 supports e.g. two or more in-line load beams 44 which in turn support and provide loading force for two data transducer heads 46, the top head only being shown in FIG. 1. Each head 46 coacts with magnetic data storage media formed on opposite major faces of a rotating data storage disk 48. A spindle 50 provides a journal to the base 12 for the disk 48, and a brushless DC spindle motor may be included within the spindle structure 50 in a conventional manner. When the storage disk 48 is rotated, an air bearing develops between the data transducer heads 46 and the data storage surface. This air bearing permits the actuator 36 to position the heads 46 at selected ones of a multiplicity of closely spaced apart, concentric data tracks defined on the storage surfaces of the disk 48. Not shown in FIG. 1 is a read/write preamplifier circuit which is also conventionally included within the interior space of the head and disk assembly 10, which is typically mounted to and connected to traces of a plastic film circuit substrate, and which is susceptible to RFI/EMI interferences. A plastic film conductor path typically extends between the plastic film substrate and the rotary actuator 36 to enable electrical connections to be made between the read/write circuit and the data transducer heads 46. This plastic film conductor path, depending upon its length, is also susceptible to pick up RFI/EMI.

The present invention advantageously combines wave absorption with reduction of circulating currents so as to more effectively suppress and reduce RFI/EMI. In particular, the overlapping sidewalls 20 and 26 provide an electrical barrier to trap and dissipate the incoming RFI/EMI energy and thereby prevent it from leaking through to the interior space of the head and disk assembly 10. At the same time, the interference wedges 24 provide very low impedance grounding paths between the base 12 and cover 14 thereby reducing circulating currents and draining them into the base casting 12. The benefits in reduction and suppression of RFI/EMI by the principles of the present invention are thus realized at extremely low cost and without addition of any separate, discrete structural elements, the interference wedges 24 being formed integrally with formation of the base casting 12, for example.

Having thus described an embodiment of the present invention it will be readily apparent to those skilled in the art that many widely varying embodiments and applications will suggest themselves without departing from the spirit of the present invention, the scope thereof being more particularly defined by the following claims. The disclosures and the description pro- vided hereinabove are by way of illustration only and should not be construed as limiting the scope hereof.

What is claimed is:

1. Apparatus for providing improved RFI/EMI shielding within a disk drive comprising a base means and a cover means:

the base means formed of conductive material for supporting a rotating data storage disk and a voice coil actuator means for positioning a data transducer head at selected ones of a multiplicity of concentric data storage tracks defined on a storage surface of the rotating data storage disk, the base means defining a substantially continuous floor and integrally formed base sidewalls extending upwardly from the floor along a periphery thereof, the base sidewalls further defining a peripheral region extending around the periphery of the base sidewalls;

a plurality of closely spaced apart, knife-blade interference wedge means being formed along and extending outwardly from the peripheral region for engaging adjacent facing portions of the cover means when it is clamped against the base means, the cover means defining a ceiling and integral cover sidewalls extending downwardly to fit closely over the peripheral region so that the adjacent facing portions thereof come into engagement with the knife-blade interference wedge means, and clamping means for clamping the cover means securely to the base means such that the adjacent facing portions of the cover means are deformed by the knife-blade interference wedge means of the base means, thereby establishing a pluralty of very low electrical impedance, closely spaced apart contacts along a gap between the cover means and the base means for grounding out RFI/EMI.

2. The apparatus set forth in claim 1 wherein the peripheral region comprises an inset-stepped region above an upper outer peripheral ledge and the plurality of spaced apart, knife-blade interference wedge means extend upwardly and outwardly from the inset-stepped region and angle inwardly toward the base sidewalls within the inset-stepped region above the ledge.

3. The apparatus set forth in claim 1 wherein the clamping means comprises a plurality of screws passing through openings of the cover means for engaging aligned threaded openings of the base means.

4. The apparatus set forth in claim 1 further comprising environmental sealing means between the cover means and the base means for sealing an interior space defined by the base means and the cover means from an external ambient environment.

5. The apparatus set forth in claim 4 wherein the environmental sealing means comprises a compressible elastomeric seal compressed between an upper peripheral surface of the base sidewalls and an interior, oppositely facing peripheral surface of the cover means.

6. The apparatus set forth in claim 1 wherein the voice coil actuator means comprises a rotary voice coil actuator having a rotary journal secured to the base means.

7. The apparatus set forth in claim 6 wherein the rotary journal is clamped to the cover means.

* * * * *